Sept. 13, 1927.  P. HELMA  1,642,024
RIGID AIRSHIP
Filed Oct. 19, 1925   3 Sheets-Sheet 2
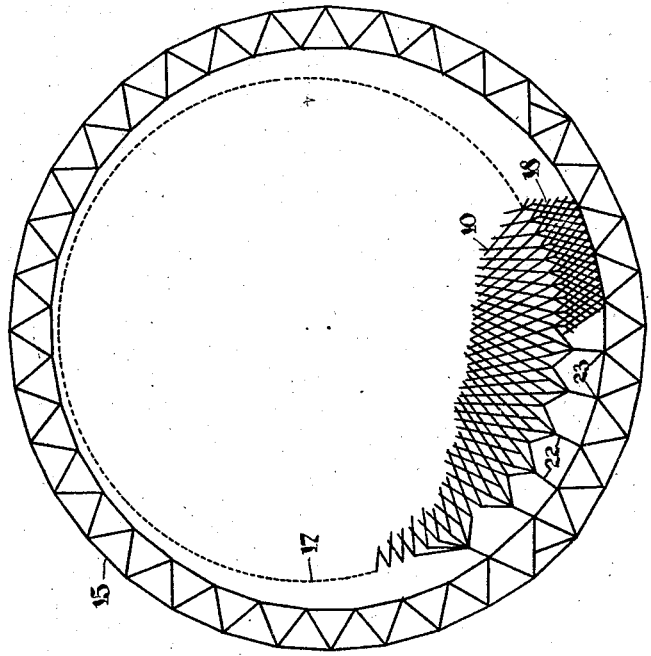
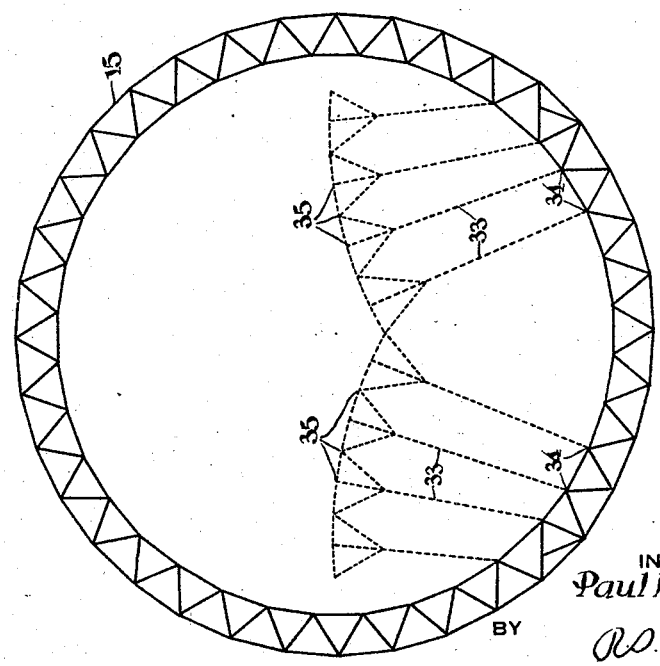
INVENTOR
Paul Helma,
BY
ATTORNEY

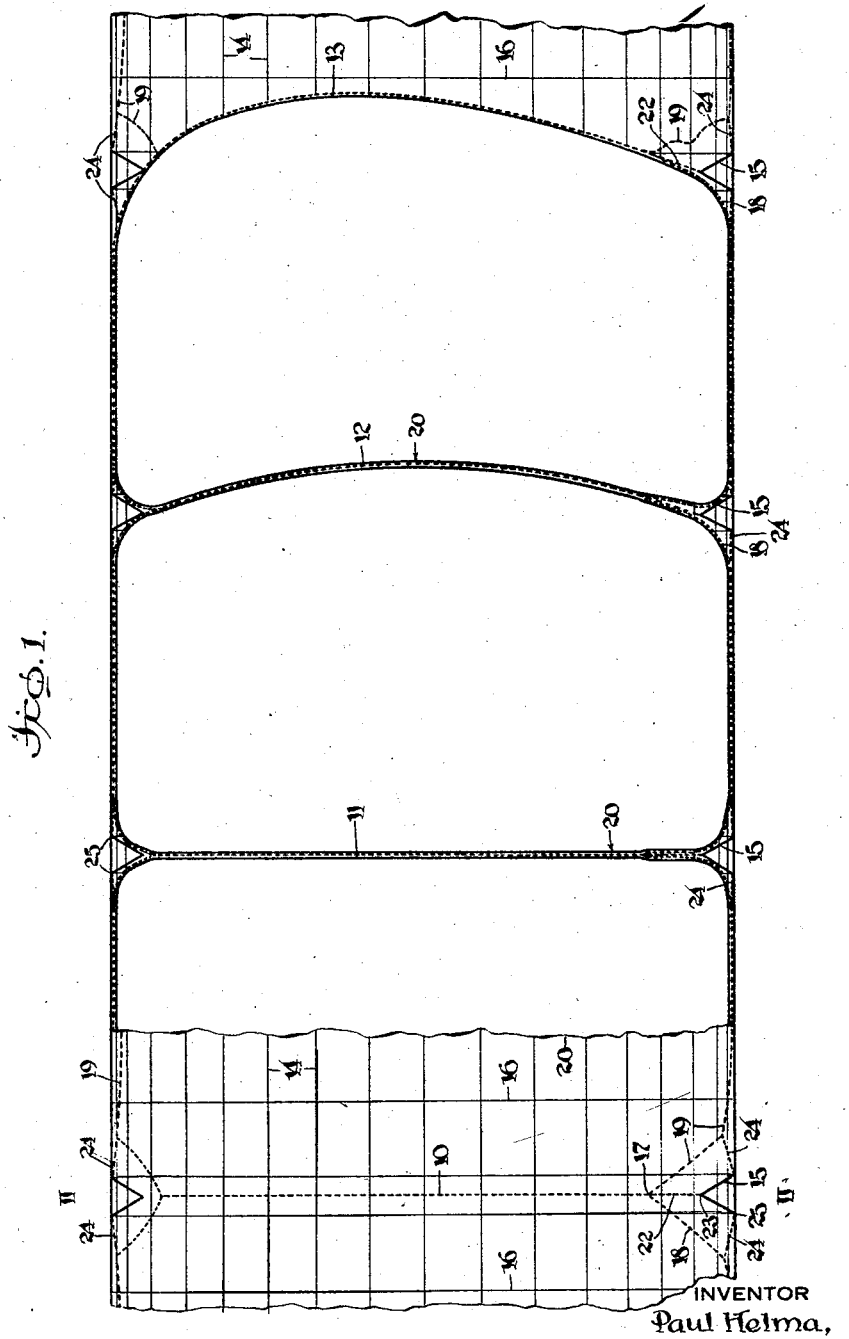

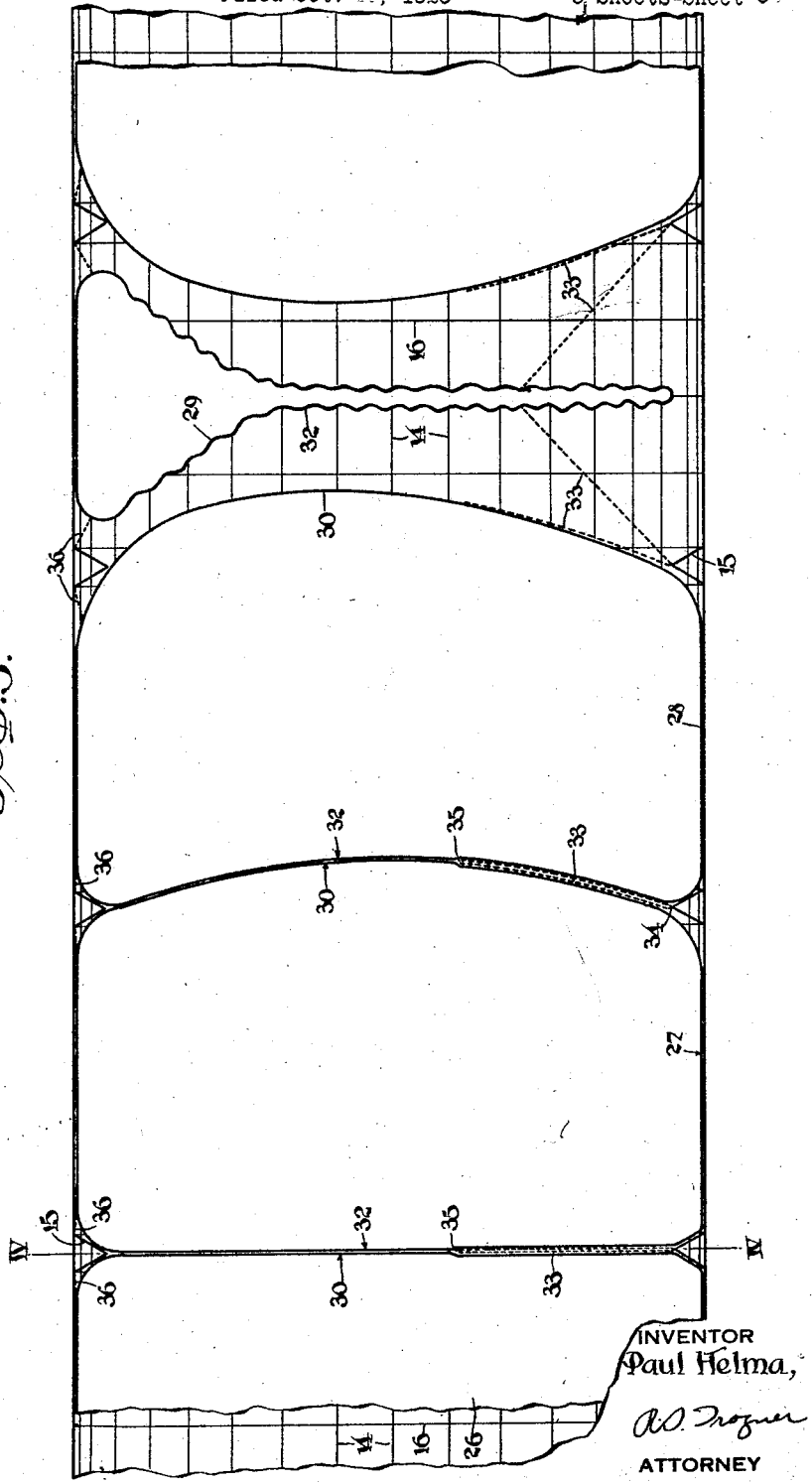

Patented Sept. 13, 1927.

UNITED STATES PATENT OFFICE.

PAUL HELMA, OF AKRON, OHIO, ASSIGNOR TO GOODYEAR-ZEPPELIN CORPORATION, OF AKRON, OHIO, A CORPORATION OF DELAWARE.

RIGID AIRSHIP.

Application filed October 19, 1925. Serial No. 63,314.

My invention relates to airships and it has particular relation to a novel construction and arrangement of bulkheads adapted to be disposed within the fabricated structure of rigid airships.

One object of my invention is to provide a novel structure and arrangement of bulkheads adapted to be employed in rigid airships, wherein a reduction in weight and amount of material necessary may be effected in fabricated airships without reducing the effective strength of the structure.

Another object of my invention is to provide an airship which is so constructed that the fabricated main rings employed therein are substantially free from torsional stresses, and the bulging stresses caused by the gas bags or cells are transmitted to the longitudinal girders of the airship substantially in alinement therewith.

In the art of building rigid airships, it is known that transversely arranged main rings may be constructed in the form of a fabricated frame-work and provided with bracing members such as wires extending across the ring, which members are necessary to stiffen the ring and serve as limiting elements against which the ends of the gas bags engage. Also, in building airships it is known that the main rings may be constructed in the form of frame-work which is inherently rigid. However, in all of these known structures, so far as I am aware, the main rings have been employed as direct supports for the bulkheads, and consequently they were subjected to compressive stresses resulting from the tension in the wire bracing members caused by the bulkheads bearing thereagainst. In addition to the compressive stresses the bulkhead imposed severe torsional stresses upon the main rings. On account of these compressive and torsional stresses, the main ring was subjected to forces of considerable magnitude, even exceeding in importance and intensity the other stresses which were imposed upon these rings.

One known method of decreasing the compressive forces consists in employing elastic nets of large camber, but there remains the disadvantage of creating relatively severe torsional stresses in the main ring. Moreover, the degree of camber required in a net structure cannot be determined with satisfactory exactness before the airship structure is assembled.

By my present invention I have eliminated the disadvantages above enumerated. According to my invention provision is made for securing a bulkhead to each main ring only at the lower portion thereof adjacent the conventional longitudinal corridors. Each bulkhead may be secured in the proper position with maximum efficiency regardless of whether it is in the form of a net or whether it is formed by the end of a gas bag or cell. It is also immaterial whether or not the cross-sectional contour of the airship is circular, elliptical or polygonal.

The bulkhead conforms substantially to the cylindrical contour of the gas bag without being fastened to the main ring, except the lower portion thereof, which is fastened to the main ring by special connections, as described in detail later. In the event that a gas bag has become deflated, or while one gas bag is being deflated adjacent another, the bag filled with gas will tend to expand beyond the normally intermediate main ring, but the connections of the gas bag to the longitudinal girders of the airship between the several main rings are so arranged that the lines of force exerted by the bulkhead and gas bag are as nearly parallel, longitudinally of the sides of the airship, as possible. Thus it will be apparent that no lateral forces are exerted in the upper part of the airship on the hull structure due to gas pressure against the bulkhead; but only substantially longitudinally extending forces are exerted which are transmitted by means of suitable connecting members to the longitudinally extending girders at any desired points between the rings or to the elongitudinally disposed girders at the points of intersection with the auxiliary or main rings.

Two kinds of forces are transmitted by the bulkheads when a gas bag is deflated; firstly, forces acting in a direction longitudinal of the airship, which are caused by the gas pressure and are transmitted directly to the longitudinally extending girders without exerting compression on the main rings, except in the lower portion thereof;

and secondly, the lifting force transmitted by the bulging of the bulkheads and acting directly through the lower part of the main ring where the loads of the airship are concentrated.

The bulging of bulkheads designed according to my invention is dependent to a small degree only upon the stretching properties of the bulkhead-forming material. Accordingly, various kinds of strong material of greater or lesser stretching limits may be employed with equal advantage. Thus, it is of relatively small importance to determine the degree of pre-stretching of a given material, because it does not materially effect the desired bulging of the bulkhead. The bulkhead should be so designed that it will not press against the main ring in the event that a gas bag is deflated, as the forces thereby exerted tend to produce torsional stresses in the main ring. On account of the fact that the stresses occurring in the bulkhead and in the main ring, when constructed in accordance with my invention, are clearly differentiated from each other, the calculation of the safety factor in the structural elements is greatly simplified as compared with the types of structures heretofore employed. In the previously known structures it was difficult to determine in advance what the degree or intensity of the stresses caused by the bulkheads acting upon the main rings would be.

My invention is applicable to bulkheads formed of netting disposed between the gas bags as well as to bulkheads formed by the ends of the gas bags themselves, in which no netting is employed. The manner of connecting the bulkheads to the airship frame does not differ essentially in the two instances. In employing a net, it is possible to provide a single bulkhead between adjacent gas bags, but when no net is employed, the bulkhead-forming walls of the gas bags must be fastened separately in order to compensate for relative movement during deflation of one of two adjacent gas bags.

For a better understanding of my invention, reference may now be had to the accompanying drawings, forming a part of this specification, of which;

Fig. 1 is a fragmentary longitudinal cross-sectional view of an airship, diagrammatically illustrating bulkheads in several positions, constructed according to one form which my invention may assume;

Fig. 2 is a fragmentary transverse cross-sectional view of an airship, diagrammatically illustrating connecting members employed in securing a bulkhead to a main ring, the view being taken substantially along the line II—II of Fig. 1;

Fig. 3 is a fragmentary longitudinal cross-sectional view of an airship, diagrammatically illustrating gas bags disposed in several positions, arranged and constructed according to another form of my invention; and Fig. 4 is a cross-sectional view, similar to Fig. 2, of bulkhead connecting members employed in the form of my invention illustrated in Fig. 3, the section being taken substantially along the line IV—IV thereof.

In practicing my invention, I provide a plurality of bulkheads 10, 11, 12, and 13, composed of netting and which are disposed within a fabricated airship structure consisting of longitudinally extending girders 14, transversely disposed main rings 15 and transversely arranged auxiliary rings 16. These elements are fabricated and secured together in the manner customarily employed in the construction of rigid airships. Each of the bulkheads 10, 11, 12 and 13 is constructed and functions in substantially the same manner, and therefore a detailed description of one is believed to be sufficient for a thorough understanding of my invention.

As best shown in Fig. 2, one circular netting 10 covers the circular area within the inner portion of the main ring 15. The periphery 17 of the netting 10 is connected to two diverging sections of netting 18 and 19, which are disposed one on each side of the main ring 15 and are adapted to lie against the inner periphery of the airship hull along the longitudinal girders 14 and provide an envelope, for a gas bag 20, extending to the next main ring. At the lower portion only of the periphery 17 of the bulkhead, I provide a series of normally radially extending suspension cords or net members 22 connected to the point of connection between the two nettings 18 and 19. These members 22 are connected, as indicated at 23, to the inner circular edge of the main ring 15. Additional edge or side portions 24, disposed on opposite sides of the main ring 15, extend along the longitudinal girders and are connected thereto at points 25 adjacent the outer periphery of the main ring 15. The portions 24 are also in the form of netting constituting substantially a continuation of the netting 19 and they provide tensional connections between the netting 19 and the outer portions of the main rings, either about the entire circumference of the latter or at spaced points therealong.

For the sake of clearness the bulkhead 10 is shown in its normal position within an airship hull before the gas bags or cells are placed therein. The bulkhead 11 is shown in the position it will assume when gas bags 20 filled with gas are placed in the airship hull at opposite sides of the bulkhead, thereby exerting approximately the same pressure on opposite sides thereof. In this position of the bulkheads a force corresponding to the pressure head is exerted by the gas bags entirely around the inner periphery of the air ship hull, while the bulk heads and their connections are substantially inactive. The bulkhead 12 is shown in the position it will assume when there is more pressure at one side thereof than at the other; for example, in case one gas bag is partially deflated, or in case the airship assumes a positive angle of pitch, i. e., when the longitudinal axis of the airship is disposed obliquely with respect to a horizontal plane. The bulkhead 13 is shown in the position it will assume when there is a deflated gas bag in the airship adjacent thereto. In either of the positions indicated by the representations of the bulkheads 12 and 13, it will be noted that the netting or cord members 22 are disposed at angles to the plane of the main ring 15. However this angularity is slight, and therefore, relatively slight torsional stresses are imparted to the main ring, and these are confined to the lower portion thereof.

As soon as one of the bulkheads is bulged, as illustrated by the bulkhead 12, the members 22 and 18 are subjected to increased tension, and the tension on the member 18 is transmitted to the longitudinal girders 14 at a very acute angle. Likewise, the portions of the members 18 or 19, depending upon the direction of bulging, at the upper part of the airship, are subjected to increased tension when the bulkhead is bulged and the forces are transmitted to the longitudinal girders 14 at an acute angle. The bulkheads 12 and 13 are illustrated as being subjected to different degrees of bulging, but the action of these bulkheads is obvious from the foregoing description.

Referring to the form of my invention shown in Figs. 3 and 4, I provide gas bags or cells 26, 27, 28 and 29 which are illustrated as being under various conditions of gas pressure, corresponding respectively to the conditions under which the bulkheads 11, 12 and 13, previously described, were observed. These gas cells are disposed in an airship constructed in the same manner as the one illustrated in Figs. 1 and 2. In this form of my invention, no netting bulkheads are employed, but the inflated gas bags are disposed with adjacent end walls 30 and 32, which constitute bulkheads, engaging each other. At the lower portion of the gas bags I provide cords or netting members 33 connected to the inner edge of the lower portion of the main rings 15 at spaced points 34, and to the gas bags as indicated at 35. The connecting points 35 are sufficiently high, toward the horizontal diameter of the main ring, to permit the gas cells to collapse when they are deflated.

At the upper part of the airship hull I provide net or cord side-members 36 secured to the respective gas bags, and to the longitudinal girders 14 at the intersection of the latter with the main rings 15. It will be apparent that the netting side-portions 36 preform a function corresponding to the function performed by the netting side-portions 24 of the other form of my invention.

In the normal inflated position of the bulkheads formed by each of the engaging end-walls 30 and 32 of the gas cells, as shown at the left hand side of Fig. 3, the gas bags engage the inner portion of the hull circumferentially thereof without imposing stresses upon either of the members 33 or 36. The bulging action of the gas bags under various conditions of gas pressure caused by deflation of certain gas cells, or by the airship assuming a positive angle of pitch, is substantially the same as that described with reference to the form of my invention disclosed in Figs. 1 and 2. The main rings are subjected to stresses only in the lower portion thereof, under conditions indicated by the positions of the engaging ends of the gas cells 27 and 28.

When bulging action occurs the upper parts of the gas cells impart tension to the netting or cords 36 on one side of each respective main ring 15. The forces exerted, as above described, are concentrated along the longitudinal girders 14 and as nearly parallel thereto as possible. The gas cell 28 is shown in the drawing as being bulged in a direction to the right of Fig. 3, and consequently the cord or netting members 36 at the upper left hand portion of the gas cell 28 are subjected to tensional forces, while the members 36 at the opposite upper right hand portion of the gas cell 28 are inactive.

In the construction above described the bulkheads may, if desired, be provided with auxiliary gas bags disposed between the ends of the main gas bags for the purpose of supplying light or fuel gas, such structure being described in detail in the copending application of Eugen Schoettel, Serial Number 44,238, filed July 17, 1925.

Although I have illustrated but two preferred forms which my invention may assume and have described those forms in detail, it will be apparent to those skilled in the art that the invention is not so limited but that various minor modifications and changes may be made therein without departing from the spirit of my invention or from the scope of the appended claims.

What I claim is:

1. An airship structure comprising longitudinally extending girders and transversely disposed rings constituting a hull, individual gas cells disposed within the hull, and means for transmitting bulging stresses of the gas cells to the hull substantially longitudinally with respect to the longitudinal girders thereof.

2. An airship structure comprising a hull including a transversely disposed main ring and longitudinally extending girders, individual gas cells disposed within the hull, and a transversely disposed bulkhead having its lower portion connected to the inner circumferential edge of the main ring and its upper portion connected to the hull adjacent the outer circumferential edge of the main ring.

3. An airship comprising longitudinally extending girders and transversely disposed rings constituting a hull, individual gas cells disposed within the hull, a transverse bulkhead provided with circumferential side portions adapted to lie circumferentially against the inner surface of the hull, and means for so attaching the side portions to the girders that the stresses caused by bulging of the gas cells are exerted substantially longitudinally of the hull.

4. An airship comprising longitudinally extending girders and transversely disposed rings constituting a hull, individual gas cells disposed in the hull, a transverse net provided with net side-portions adapted to lie circumferentially against the inner surface of the hull on opposite sides of each ring but free therefrom, and means for connecting the net side-portions to the girders, and a plurality of flexible members attached to the lower inner edge of each ring and to the lower portion of each transverse net.

5. An airship structure comprising a hull including transversely disposed inherently rigid main rings, bulkheads disposed adjacent a plurality of the main rings, means for connecting the bulkheads to the main rings to impose a lifting load on the lower section thereof, and means for connecting the bulkheads to the upper peripheral portion of the main rings to impose stresses substantially longitudinally of the hull.

6. An airship comprising a hull including a transversely disposed main ring, a bulkhead disposed within the hull, and means for connecting the lower edge of the bulkhead to the main ring in such manner that the bulkhead when bulged will impose lifting forces upon the main ring, said means being operable to exert forces only upon the lower portion of the main ring.

7. An airship comprising a fabricated structure including an inherently rigid transversely disposed main ring of substantially triangular cross-section, a bulkhead disposed transversely of the structure adjacent the main ring, flexible members connecting only the lower inner circumferential edge of the main ring to the bulkhead, and connections between the bulkhead and the fabricated structure adjacent the main ring, the flexible members being adapted to exert lifting forces on the main ring when the bulkhead is moved to such position that it is at an angle to the plane of the main ring.

8. An airship comprising longitudinally extending girders and transversely disposed rings constituting a hull, individual gas cells disposed within the hull with their ends engaging each other, means engaging the lower portion of each gas cell independently, said means being operatively connected to the lower inner edge of the main ring, and means engaging the upper portion of the gas cells and connected to the girders independently of the main rings to impose stresses upon the girders longitudinally thereof.

In witness whereof, I have hereunto signed my name.

PAUL HELMA.